Dec. 15, 1931.  C. W. HILL ET AL  1,836,469
ENGINE
Filed Jan. 18, 1928   5 Sheets-Sheet 1

Witness:
William P. Kilroy

Inventors
Charles W. Hill
Joy Kelley

By Hill & Hill, Attys

Dec. 15, 1931.  C. W. HILL ET AL  1,836,469
ENGINE
Filed Jan. 18, 1928  5 Sheets-Sheet 2

Witness:
William P. Kilroy

Inventors
Charles W. Hill
Jay Ketley

By Hill & Hill  Attys

Dec. 15, 1931.   C. W. HILL ET AL   1,836,469
ENGINE
Filed Jan. 18, 1928   5 Sheets-Sheet 3

Witness:
William P. Kilroy

Inventors
Charles W. Hill
Jay Kelley

Dec. 15, 1931.  C. W. HILL ET AL  1,836,469
ENGINE
Filed Jan. 18, 1928   5 Sheets-Sheet 5

Witness:
William P. Kilroy

Inventors
Charles W. Hill
Joy Kelley
Hill & Hill Attys

Patented Dec. 15, 1931

1,836,469

UNITED STATES PATENT OFFICE

CHARLES W. HILL AND JOY KELLEY, OF MARENGO, ILLINOIS

ENGINE

Application filed January 18, 1928. Serial No. 247,571.

This invention pertains to the general class of engines and particularly to the class of rotary engines. An object of applicants' invention is the production of a rotary engine of a relatively small number of parts, of high efficiency, economical to manufacture, of a small number of moving parts, and practically free from vibration. A further object of applicants' invention is the production of a rotary engine that is durable, dependable and satisfactory for its intended purpose. A further object of applicants' invention is the production of a rotary engine that may be operated successfully at a wide range of speeds and will operate with a variety of fluids.

Many other objects and advantages of the construction herein shown and described will be obvious to those skilled in the art from the disclosure herein given.

To this end our invention consists in the novel construction, arrangement and combination of parts herein shown and described, and more particularly pointed out in the claims.

In the drawings, wherein like reference characters indicate like or corresponding parts;

Fig. 4 is a section on line 4—4 of Fig. 3;

Fig. 10 is a section on line 10—10 of Fig. 4.

Figure 5:
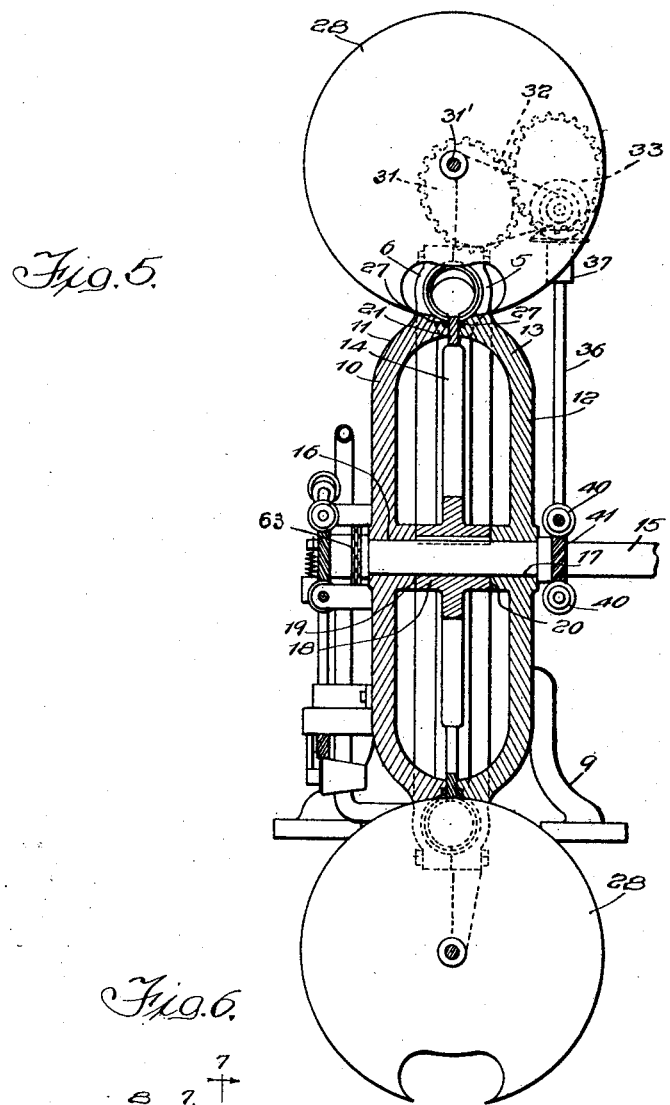
Fig. 5 is a section on line 5—5 of Fig. 1.

Referring now to the drawings in which a preferred embodiment of applicants' invention is shown at 1. In the preferred form applicants' invention includes a circular or annular cylinder 2 which is formed by annular grooves 3 and 4 in annular cylinder sections 5 and 6, respectively. The outer peripheral edges of cylinder sections 5 and 6 are shaped to form a tight joint at 7 and are secured together by a plurality of bolts or other securing means 8. The cylinder sections 5 and 6 are shown supported by a plurality of legs 9. Extending inwardly from annular cylinder section 6 are a plurality of bearing supporting arms 10 which are preferably curved outwardly as shown at 11 in Fig. 5. Extending inwardly from annular cylinder section 5 are a plurality of bearing supporting arms 12 which are preferably curved as shown at 13. The purpose of the curved portions 11 and 13 in arms 10 and 12, respectively, is to furnish clearance for the rotary member 14 mounted on shaft 15. Shaft 15 is journaled in bearings 16 and 17 formed at the intersections of inwardly extending arms 10 and 12, respectively.

The rotary member 14 is shown as composed of a spider formed integral with a hub 18. The faces of the hub 18 engage the inner faces 19 and 20 of bearings 16 and 17, respectively, in order to avoid end play. At the outer rim of the rotary member 14 is attached a flat annular ring 21 which extends outwardly between cylinder sections 5 and 6 and supports pistons 22, 23 and 24 on its outer peripheral edge. Pistons 22, 23 and 24 are identical and may be attached to the annular ring by any suitable means such as bolts 25. Pistons 22, 23 and 24 may be provided with rings 26. Annular rings 27 may also be provided in suitable annular grooves in each of the cylinder sections 5 and 6, said annular compression rings 27 to engage the faces of the annular ring 21. All of these parts may be accurately machined in order to form gas tight joints.

The grooves 3 and 4 in cylinder sections 5 and 6, respectively, are so formed as to accommodate the pistons 22, 23 and 24 in order that same may rotate on the rotary member 14, the pistons 22, 23 and 24 following closely the contour of grooves 3 and 4. The rings 26 on the pistons 22, 23 and 24 assist in preventing leakage past the pistons.

Positioned about the annular cylinder 2 and preferably equally spaced, are a plurality of disks 28. The disks 28 are shown four in number and cut cylinder 2 at an angle approximately normal to said cylinder. A plurality of grooves 29 in annular cylinder 2 accommodate the disks 28. The diameter of the disks 28 is such that the outer peripheral edge of same just clears the outer peripheral edge of the annular piston supporting ring 21. The annular disks 28 are rotatably mounted on brackets 30 and 30' secured to the annular cylinder 2. An eccentric gear 31 is secured to a shaft 31' projecting through brackets 30 and 30' and to which disk 28 is securely attached. Bracket 30' has an extended portion 32 on which is rotatably mounted a complementary eccentric gear 33. A bevel gear 34 is mounted adjacent eccentric gear 33 and constrained to rotate therewith. Bevel gear 34 meshes with bevel gear 35. Bevel gear 35 is mounted on shaft 36. Shaft 36 is supported adjacent bevel gear 35 in bearing 37. Bearing 37 is secured to annular cylinder 2 by a bracket 38. The other end of shaft 36 is journaled in bearing 39 adjacent shaft 15 and has attached thereto spiral gear 40 which engages spiral gear 41 attached to shaft 15. These spiral gears are preferably right angle spiral gears, as shown. It is thus seen that rotation of shaft 15 causes a rotation of each disk 28 inasmuch as the construction of each disk 28 and parts appurtenant thereto for the operation of same are identical.

In the form shown each disk 28 is geared to make three revolutions for each revolution of the shaft 15. This is necessary inasmuch as the notch 42 must be in position three times per revolution to allow each piston to pass therethrough in order that the pistons may not be engaged by a disk 28. Eccentric gears 31 and 33 are preferably provided in order that disk 28 may open and close the annular passage formed by grooves 3 and 4 as quickly as possible. The disk 28, therefore, moves fastest when the notch 42 is passing through groove 29.

Figure 9:
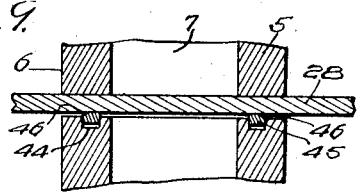
Fig. 9 is a section on line 9—9 of Fig. 8.

Cylinder section 5 is provided with a plurality of port holes 43. One face of each groove 29 may be formed with an arcuately shaped depression 44 to accommodate a ring 45, (see Fig. 9). Ring 45 engages one face of plate 28 and has its outer peripheral edge beveled as shown at 46 to avoid interfering with the periphery of notch 42 as same passes through groove 29.

Figure 1:
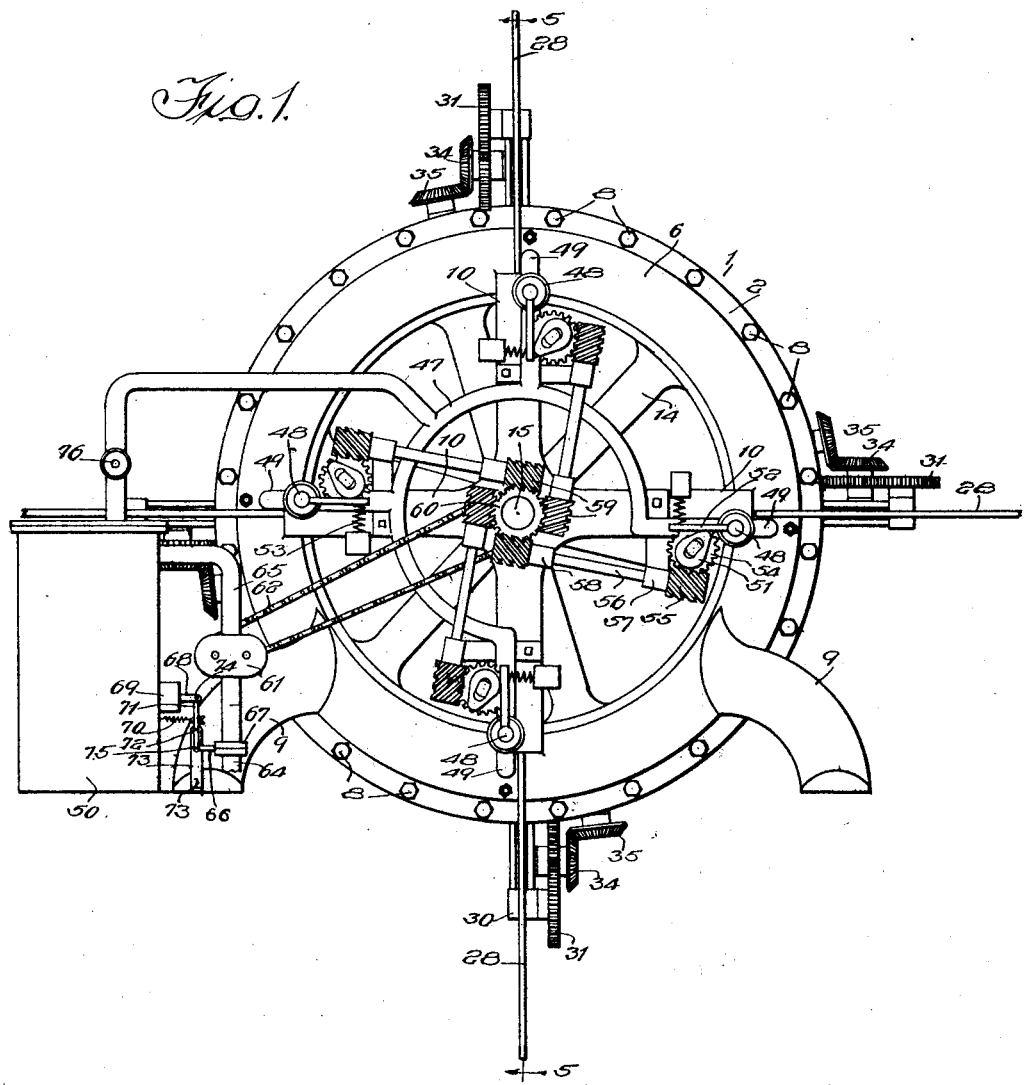
Fig. 1 is a front elevation of the novel rotary engine.
Figure 8:
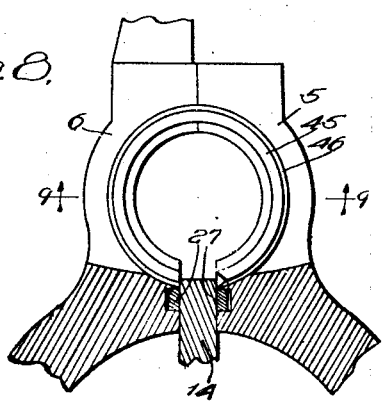
Fig. 8 is a section on line 8—8 of Fig. 4.
Figure 2:
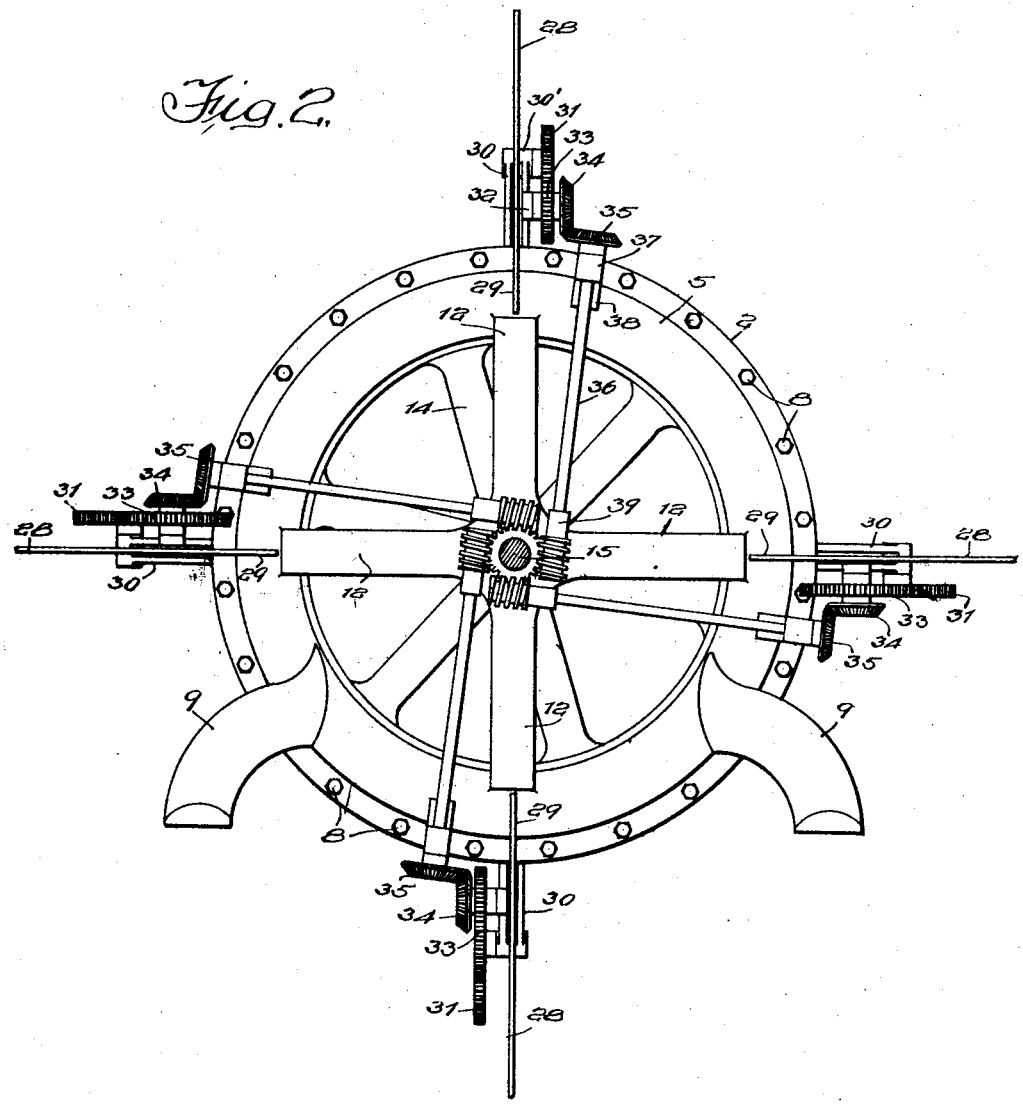
Fig. 2 is a rear elevation of the same.
Figure 3:
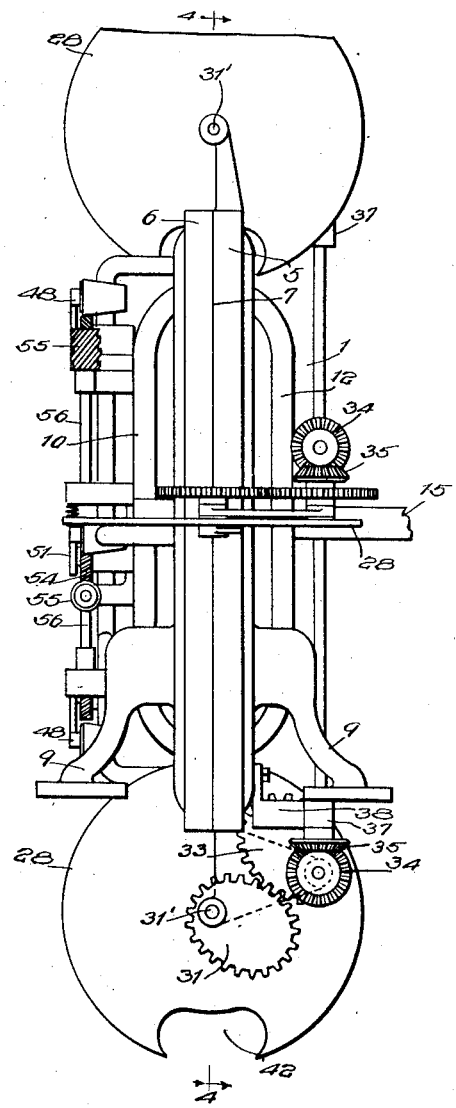
Fig. 3 is an end view.

Referring now to Fig. 1, at 47 is shown a fuel manifold which supplies combustible fluid to the annular cylinder 2 through valves 48 and apertures 49 in cylinder 2. Manifold 47 is supplied with combustible fluid from compression tank 50. Valves 48 are preferably rotary in operation and each is operated by a cam 51 engaging an arm 52 on each of the valves 48. A spring 53 is provided to hold arm 52 in engagement with the cam 51. Cam 51 is operated by means of a gear 54 constrained to rotate therewith. Gear 54 is in mesh with gear 55 on shaft 56. Shaft 56 is journaled in bearings 57 and 58. The inner end of shaft 56 has secured thereto a gear 59 which engages a gear 60 constrained to rotate with shaft 15. In the form shown in Fig. 1, there are four shafts 56, four valves 48 and four cams 51 and parts appurtenant thereto. Valves 48 in the form shown open and close three times per revolution of shaft 15 and cams 51 are geared to shaft 15 so that cams 51 make three revolutions for one revolution of shaft 15.

Combustible fluid under relatively constant pressure is supplied to manifold 47 by means of pressure tank 50. Constant pressure is maintained in pressure tank 50 by means of pump 61 which is operated by belt 62 and pulley 63 on shaft 15. Combustible fluid is supplied to pump 61 from any source through pipe 64. An inward movement of the member 66 opens valve 67. An outward movement closes valve 67. At 68 is shown a plunger operating in cylinder 69 which opens into tank 50. Plunger 68 is urged inward by adjustable spring 70 which is attached to a lever 71 which is pivoted at 72 to a bracket 73. Lever 71 is pivoted to plunger 68 at 74 and to member 66 at 75. It is readily seen that an outward movement of plunger 68 closes valve 67 and an inward movement of plunger 68 opens valve 67. By adjustment of the tension on spring 70, the amount of pressure in tank 50 may be regulated. The pressure in tank 50 is held constant inasmuch as a decrease in pressure causes the plunger 68 to move into cylinder 69 thus opening valve 67 and allowing fluid to enter pump 61. When the pressure has been restored to normal, plunger 68 moves outward, thus closing valve 67 and shutting off the flow of fluid to pump 61.

Figures 4, 10:
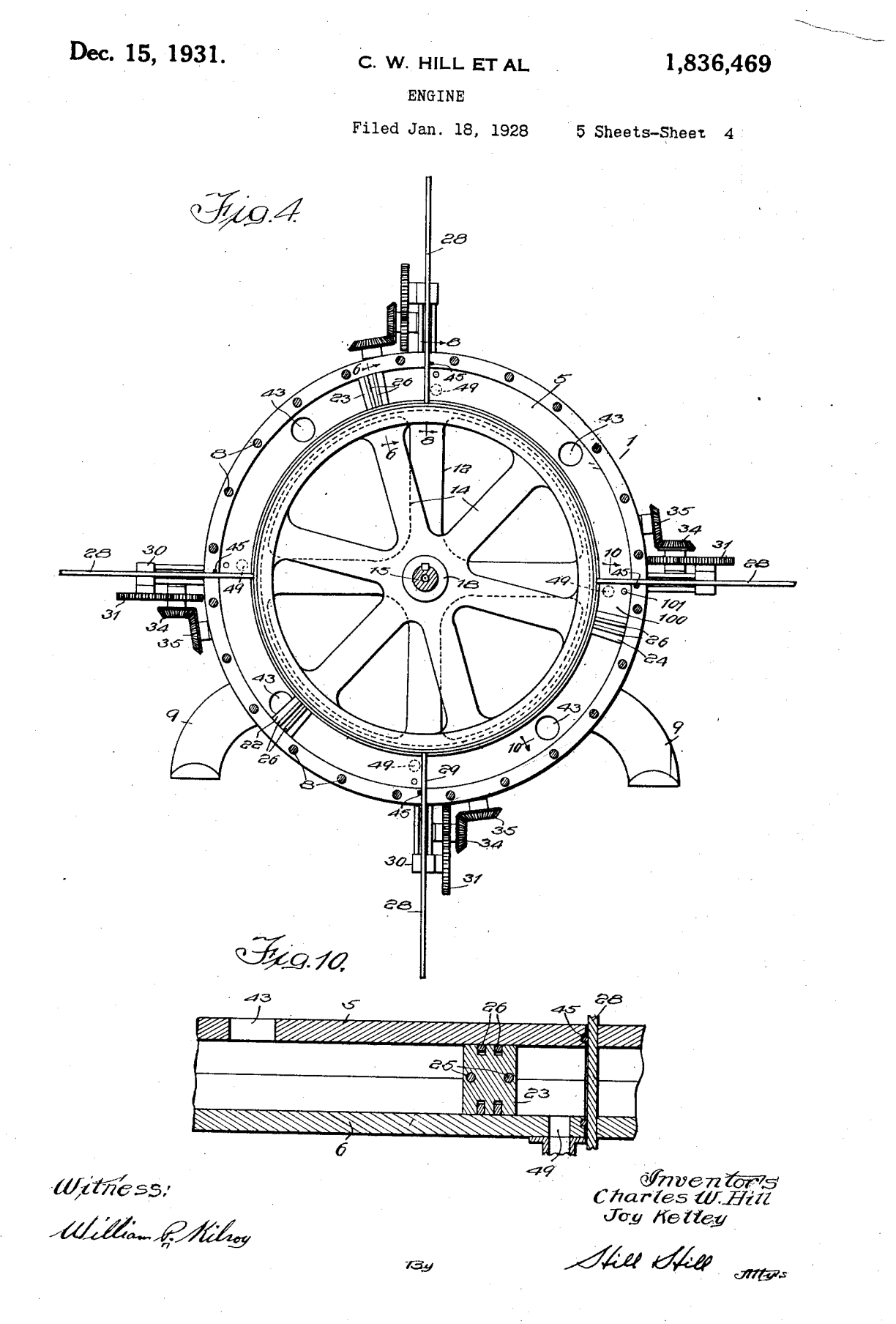

The operation of the device is as follows: Referring to Fig. 4, the piston 24 is shown in a position of having just passed through a disk 28. The rotation of member 14 with respect to Fig. 4 is clockwise. When piston 24 is in the position shown, the cam operating the valve 48 opens same, supplying combustible fluid under pressure through aperture 49 into the space between piston 24 and plate 28, and for the purposes of this description numbered 100. A spark plug 101 is provided just within the plate 28 and in the chamber 100. After valve 48 is closed by the operation of its cam and spring, a spark is supplied by the spark plug 101 connected to a standard ignition system (not shown), thus igniting the combustible fluid in the chamber 100. The expansion of the fluid causes the piston 24 to rotate clockwise and toward the exhaust port 43. After piston 24 has passed the exhaust port 43 the spent gas is exhausted through said port. When piston 24 approaches plate 28, as shown at the bottom of Fig. 4, the mechanism operating plate 28 will bring the notch 42 therein in such position as to allow the piston 24 to pass through. As soon as piston 24 has passed through the notch 42, the disk 28 is rotated as rapidly as possible by means of the eccentric gears in order to bring an unapertured portion of the disk 28 into the groove 29. A gas tight joint is thus provided at the rear of the piston. Another charge is then placed behind the piston and ignited as previously explained. The piston 24 in one revolution has imparted to it four such impulses. There being three pistons in the form shown, each piston will receive four impulses and the rotary member 14 will receive 12 impulses per revolution. This is equivalent in number of impulses to a twenty-four cylinder four cycle reciprocating internal combustion engine. It is readily seen that continuous power is supplied to the shaft 15. Inasmuch as the rotary member 14 with parts appurtenant thereto may be readily balanced, it is seen that the vibration of the machine is reduced to a minimum. Non-friction bearings may be substituted for the bearings shown at 16 and 17. The necessity of thrust bearings at the ends of the hub 18 is not urgent. However, same may be installed if desired. A gas tight joint is maintained between cylinder sections 5 and 6 and the annular ring 21 by means of the annular rings 27. Springs may be placed behind the annular rings 27 in order to force same outward into contact with the annular ring 21. The ring 45 may also be pressed outward by a spring causing same to engage the plate 28. It is thus seen that a highly efficient device is provided, satisfactory for its intended purpose.

Figure 6:
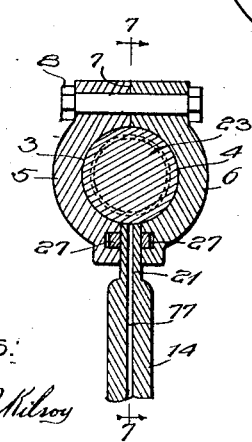
Fig. 6 is a section on line 6—6 of Fig. 4.
Figure 7:
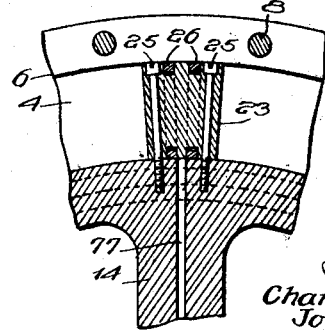
Fig. 7 is a section on line 7—7 of Fig. 6.

A valve 76 shown in Fig. 1 may be inserted in the pipe line leading from tank 50 to manifold 47. This valve is obviously for the purpose of starting and stopping the engine. A speed control device may also be installed if desired, such as a butterfly in said pipe line, same connected to a governor. Means for oiling the cylinder is shown in Figs. 6, and 7 wherein a channel 77 leads to the bottom of each piston. It is obvious that the machine may be readily started and stopped by means of the valve 76. The valves 48 are oscillatory and disks 28 are shown rotary. However, same may be made reciprocating if desired. The outer peripheral edge of annular ring 21 may be made concave in cross-section in order to fit more closely the periphery of each plate 28. The outer peripheral edge of each plate 28 may also be made concave in cross-section to fit more closely the outer peripheral edge of the annular ring 21. These provisions and many others will be obvious to persons skilled in the art. In the form shown, the engine is intended to be run by the successive ignition of combustible fluid in the rear of the pistons. However, it it is obvious that the revice shown may be run equally well with steam or any other similar expansible fluid. In the form shown, a large percentage of the power consumed by the pump 61 is returned to the pistons inasmuch as the combustible fluid is inserted in the rear of the pistons under pressure.

Having thus described our invention, it is obvious that various immaterial modifications may be made in the same without departing from the spirit of our invention; hence we do not wish to be understood as limiting ourselves to the exact form, construction, arrangement and combination of parts herein shown and described, or uses mentioned.

What we claim as new and desire to secure by Letters Patent is:

1. In an engine of the class described, a shaft, an annular cylinder having a transverse notch therein, a piston in said cylinder, a member secured to said shaft and piston and rotatable about the axis of said cylinder, means including a plate having an axis disposed transversely to the axis of said shaft and rotatable partially in said notch for successively forming an expansion chamber with said piston in said cylinder, said plate having an aperture therein for permitting the passage of said piston, a spiral gear secured to said shaft, and means operatively related to said gear for rotating said plate at a non-uniform rate of speed so that the plate may be rotating at a higher speed when the aperture thereof is in registry with said cylinder than at other points in its cycle.

2. In an engine of the class described, a shaft, an annular cylinder having a transverse notch therein, a piston in said cylinder, a member secured to said shaft and piston and rotatable about the axis of said cylinder, means including a plate having an axis of rotation disposed transversely to the axis of said shaft and rotatable partially in said notch for successively forming an expansion chamber with said piston in said cylinder, said plate having an aperture therein for permitting the passage of said piston, a spiral gear secured to said shaft, and means including an eccentric gear operatively related to said spiral gear for rotating said plate at a non-uniform rate of speed so that the plate may be rotating at a higher speed when the aperture thereof is in registry with said cylinder than at other points in its cycle.

3. In an engine of the class described, an annular cylinder having a transverse notch therein, a piston in said cylinder, a member rotatable about the axis of said cylinder and secured to said piston, means including a plate rotatable partially in said notch for successively forming an expansion chamber with said piston in said cylinder, said plate having an aperture therein for permitting the passage of said piston, and means including a pair of eccentrically mounted elliptical gears rotatable on axes disposed transversely to the axis of said cylinder for rotating said plate at a non-uniform rate of speed so that said plate may be rotating at a higher speed when the aperture thereof is in registry with said cylinder than at other points in its cycle.

4. In an engine of the class described, a shaft, an annular cylinder having a transverse notch therein, a piston in said cylinder, a member secured to said shaft and piston and rotatable about the axis of said cylinder, means including a plate rotatable partially in said notch for successively forming an expansion chamber with said piston in said cylinder, means for rotating said plate, a spiral gear mounted on said shaft, means for successively ejecting fluid into said expansion chamber, said means including a valve, means for actuating said valve including a cam and means operatively related to said cam and spiral gear for actuating said valve, and means for exhausting waste fluid from said cylinder.

In testimony whereof, we have hereunto signed our names.

C. W. HILL.
JOY KELLEY.